United States Patent
Kim et al.

(10) Patent No.: US 9,170,464 B2
(45) Date of Patent: Oct. 27, 2015

(54) ELECTRIC-FIELD EXPOSURE METHOD AND DISPLAY PANEL MANUFACTURED BY THE ELECTRIC-FIELD EXPOSURE METHOD

(71) Applicant: SAMSUNG DISPLAY CO., LTD., Yongin, Gyeonggi-Do (KR)

(72) Inventors: Sung-Hwan Kim, Yongin-Si (KR); Il-Gon Kim, Seoul (KR); Sang-Uk Lim, Yongin-Si (KR); Mee-Hye Jung, Suwon-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 100 days.

(21) Appl. No.: 14/158,232

(22) Filed: Jan. 17, 2014

(65) Prior Publication Data

US 2015/0029434 A1      Jan. 29, 2015

(30) Foreign Application Priority Data

Jul. 23, 2013 (KR) ........................ 10-2013-0086401

(51) Int. Cl.
  *G02F 1/1333* (2006.01)
  *G02F 1/1362* (2006.01)
  *G02F 1/1345* (2006.01)

(52) U.S. Cl.
  CPC ........ *G02F 1/136286* (2013.01); *G02F 1/1345* (2013.01)

(58) Field of Classification Search
  CPC ............................................ G02F 2001/136295
  USPC ............................................................. 349/40
  See application file for complete search history.

(56) References Cited

U.S. PATENT DOCUMENTS

| | | | |
|---|---|---|---|
| 8,279,147 B2 | 10/2012 | Lee et al. | |
| 8,325,315 B2 | 12/2012 | Kwak | |
| 2003/0071570 A1 | 4/2003 | Tamashiro et al. | |
| 2007/0097308 A1* | 5/2007 | Liu et al. | 349/149 |
| 2008/0165300 A1* | 7/2008 | Sung et al. | 349/40 |
| 2008/0303968 A1* | 12/2008 | Terada et al. | 349/46 |
| 2010/0225870 A1* | 9/2010 | Park et al. | 349/149 |
| 2011/0199346 A1 | 8/2011 | Ko et al. | |

FOREIGN PATENT DOCUMENTS

| KR | 10-2001-0056367 | 7/2001 |
|---|---|---|
| KR | 10-2006-0068268 | 6/2006 |

* cited by examiner

*Primary Examiner* — Paul Lee

(74) *Attorney, Agent, or Firm* — F.Chau & Associates, LLC

(57) ABSTRACT

An electric-field exposure method includes forming a display cell. The display cell comprises a pixel electrode electrically connected to a data line and a gate line. A guard-ring line surrounds a display area on which the pixel electrode is disposed. A common electrode overlaps the guard-ring line. A resistance division part is connected to a node which is connected to a data pad and a gate pad. A first electrode and a second electrode are provided with first and second electronic signals, respectively. The first electrode is connected to the guard-ring line. The second electrode is electrically connected to the common electrode. The node is provided with a divided signal obtained by dividing the first and second signals through the resistance division part.

21 Claims, 7 Drawing Sheets

ELECTRIC-FIELD EXPOSURE METHOD AND DISPLAY PANEL MANUFACTURED BY THE ELECTRIC-FIELD EXPOSURE METHOD

This application claims priority 35 U.S.C. §119 to Korean Patent Application No. 10-2013-0086401 filed on Jul. 23, 2013, the disclosure of which is incorporated by reference herein in its entirety.

TECHNICAL FIELD

Exemplary embodiments of the present invention relate to displays, and more particularly, to an electric-field exposure method and a display panel manufactured by the electric-field exposure method.

DISCUSSION OF THE RELATED ART

An electric-field exposure process is used for allowing liquid crystal molecules in an LCD panel to have pre-tilt angles. In the electric-field exposure process, an electric field is formed in the LCD panel, and light is radiated to the LCD panel. By the electric-field exposure process, a curing layer is formed on the array substrate and the opposing substrate of the LCD panel. The curing layer has a pre-tilt angle that allows the LC molecules to be arranged in a predetermined direction.

SUMMARY

According to an exemplary embodiment of the invention, an exposure method using an electric-field includes forming a display cell. The display cell comprises a pixel electrode electrically connected to a data line and a gate line. A guard-ring line surrounds a display area on which the pixel electrode is disposed. A common electrode overlaps the guard-ring line. A resistance division part is connected to a node which is connected to a data pad and a gate pad. A first electrode and a second electrode are provided with first and second electronic signals, respectively. The first electrode is connected to the guard-ring line. The second electrode is electrically connected to the common electrode. The node is provided with a divided signal obtained by dividing the first and second signals through the resistance division part. Light is radiated to the display cell when a first electric field is formed between the guard-ring line and the common electrode, and a second electric field is formed between the pixel electrode and the common electrode.

In an exemplary embodiment of the present invention, the exposure method may further include forming a curing layer. The curing layer has a pre-tilt angel between the pixel electrode and the common electrode.

In an exemplary embodiment of the present invention, the display cell may include a seal line including a sealant. The guard-ring line is disposed between the seal line and the display area.

In an exemplary embodiment of the present invention, the display cell may include a data connection line commonly connected to the data line and a gate connection line commonly connected to the gate line. The data connection line is connected to the gate connection line through the node.

In an exemplary embodiment of the present invention, the resistance division part may include a transistor.

In an exemplary embodiment of the present invention, the first electric field may be stronger than the second electric field.

In an exemplary embodiment of the present invention, the exposure method may further include forming a curing layer. The curing layer has a single pre-tilt angel between the pixel electrode and the common electrode.

In an exemplary embodiment of the present invention, the pixel electrode may include a first sub pixel electrode connected to a first data line. A second sub pixel electrode is connected to a second data line and is spaced apart from the first sub pixel electrode.

In an exemplary embodiment of the present invention, the display cell may include a first data connection line connected to a first data pad of the first data line. A second data connection line is connected to a second data pad of the second data line. A first node is connected to the first data connection line. A second node is connected to the second data connection line.

In an exemplary embodiment of the present invention, the resistance division part may be connected to the first electrode, the second electrode, the first node, and the second node. The resistance division part may divide the first and second electronic signals into a first divided signal and a second divided signal and may provide the first and second nodes with the first and second divided signals, respectively.

In an exemplary embodiment of the present invention, the second electric field may be formed between the first sub pixel electrode and the common electrode. A third electric field may be formed between the second sub pixel electrode and the common electrode.

In an exemplary embodiment of the present invention, the first electric field may be stronger than the second and third electric fields.

In an exemplary embodiment of the present invention, the second electric field may be different from the third electric field.

In an exemplary embodiment of the present invention, the exposure method may further include forming a curing layer. The curing layer has a first pre-tilt angle formed in a first area having the first sub pixel electrode and a second pre-tilt angle formed in a second area having the second sub pixel electrode.

According to an exemplary embodiment of the invention, a display panel includes a pixel electrode disposed in a display area of a first substrate and connected to a data line and a gate line. A guard-ring line is disposed in a peripheral area and surrounds an outside of the display area. A common electrode is disposed on a second substrate opposite the first substrate. The common electrode overlaps the pixel electrode and the guard-ring line. A first electrode is connected to the guard-ring line. A second electrode is disposed on the first substrate and is connected to a shorting point. The shorting point is electrically connected to the common electrode. A resistance division part is disposed on the first substrate. The resistance division part comprises a transistor connected to the first electrode and the shorting point.

In an exemplary embodiment of the present invention, the display panel may further include a seal line disposed between the guard-ring line and the display area.

In an exemplary embodiment of the present invention, the display panel may further include a curing layer which has at least one pre-tilt angel between the pixel electrode and the common electrode.

In an exemplary embodiment of the present invention, the pixel electrode may include a first sub pixel electrode connected to a first data line. A second sub pixel electrode is connected to a second data line and is spaced apart from the first sub pixel electrode.

In an exemplary embodiment of the present invention, the display panel may further include a curing layer. The curing layer comprises a first pre-tilt angle between the first sub pixel electrode and the common electrode and a second pre-tilt angle between the second sub pixel electrode and the common electrode.

In an exemplary embodiment of the present invention, the display panel may further include a data connection line disposed adjacent to a data pad of the data line. The data connection line extends in a direction substantially parallel with the gate line. A gate connection line is disposed adjacent to a gate pad of the gate line. The gate connection line extends in a direction substantially parallel with the data line. The resistance division part is connected to the data connection line and the gate connection line.

According to an exemplary embodiment of the present invention, A display panel comprises a first substrate having a display area and a peripheral area surrounding the display area. A pixel electrode is disposed in the display area, and a guard-ring line is disposed in the peripheral area. A second substrate is positioned opposite the first substrate. The second substrate includes a common electrode overlapping the pixel electrode and the guard-ring line. A first electrode is connected to the guard-ring line. The first electrode is applied with a first level voltage. A second electrode is connected to the common electrode. The second electrode is applied with a second level voltage. A node electrode is connected to the pixel electrode. The node electrode is applied with a third level voltage. A resistance division part is connected to the first electrode and the node electrode. The resistance division part is configured to output the third level voltage by dividing the first level voltage and the second level voltage.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, exemplary embodiments of the present invention will be described in detail with reference to the accompanying drawings. The present invention, however, may be modified in various different ways, and should not be construed as limited to the embodiments set forth herein. The same reference denotations may be used to refer to the same or substantially the same elements throughout the specification and the drawings. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
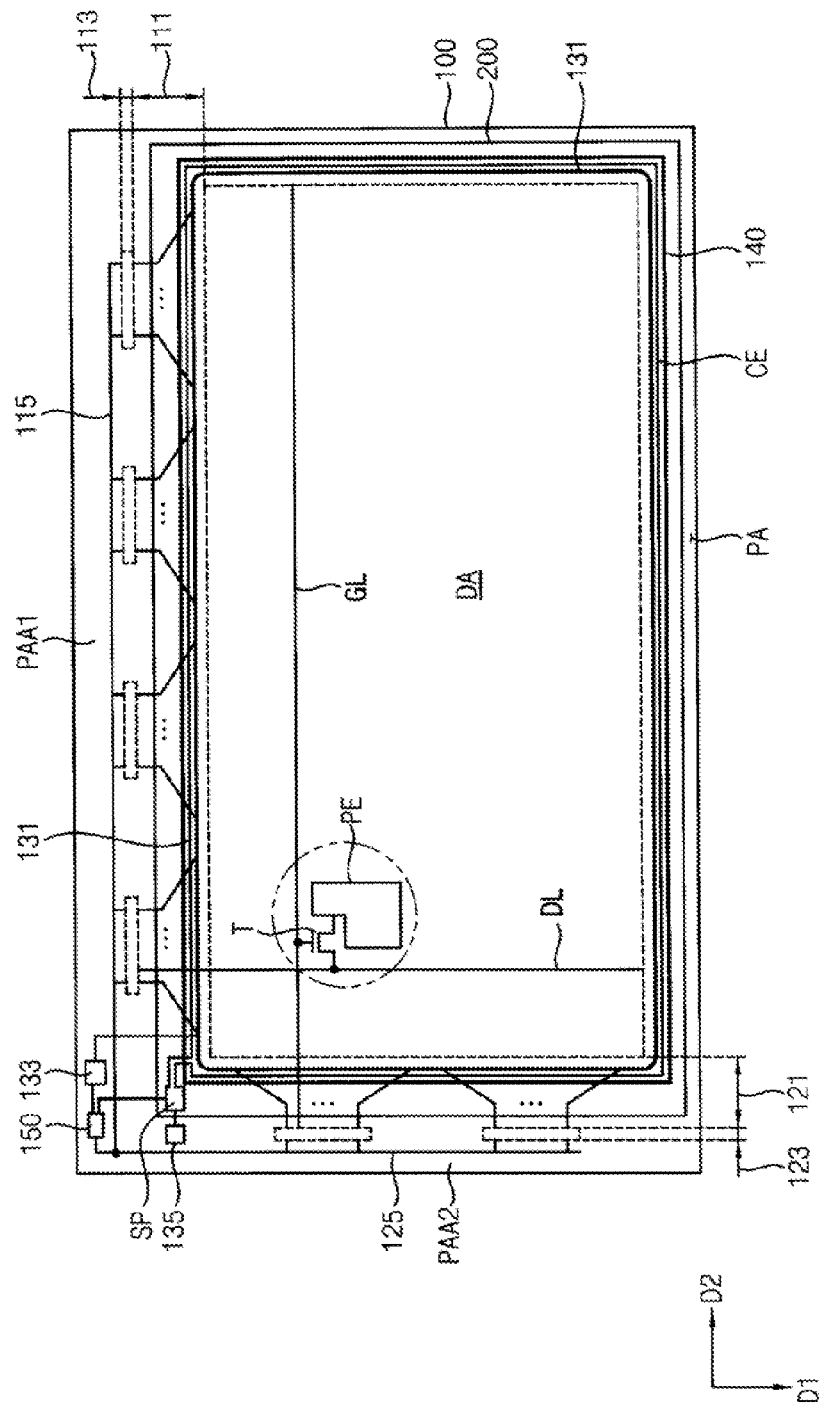
FIG. 1 is a plan view illustrating a display cell according to an exemplary embodiment of the present invention.
Figure 2:
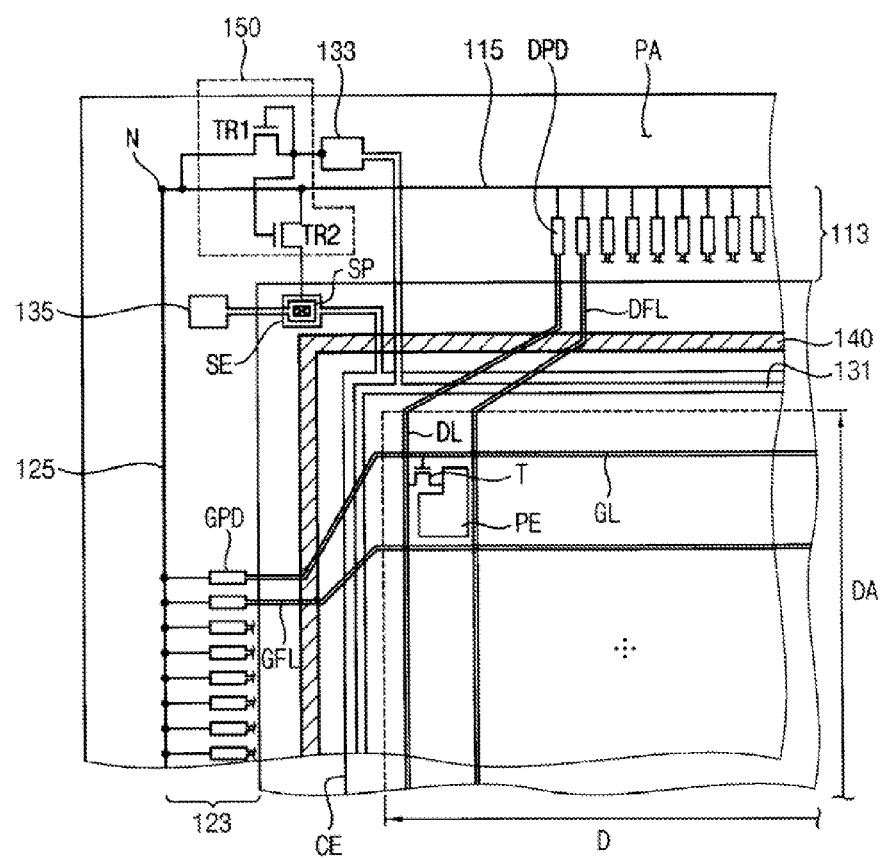
FIG. 2 is an enlarged view illustrating a portion of a display cell as shown in FIG. 1, according to an exemplary embodiment of the present invention.

FIG. 1 is a plan view illustrating a display cell according to an exemplary embodiment of the present invention. FIG. 2 is an enlarged view illustrating a portion of a display cell as shown in FIG. 1, according to an exemplary embodiment of the present invention.

Referring to FIGS. 1 and 2, the display cell is a panel obtained after a combination process and a liquid crystal (LC) injection process being finished and before an electric-field exposure process.

The display cell may include a first substrate 100, a second substrate 200 and a liquid crystal layer. The display cell may be divided into a display area DA and a peripheral area PA surrounding the display area DA.

A plurality of data lines DL, a plurality of gate lines GL, a plurality of switching elements T and a plurality of pixel electrodes PE are disposed in the display area DA of the first substrate 100.

The data lines DL extend in a first direction D1 of the display cell and are arranged in a second direction D2 crossing the first direction D1. The gate lines GL extend in the second direction D2 and are arranged in the first direction D1. The switching elements T are connected to the data lines DL and the gate lines GL. The pixel electrodes PE are disposed in their respective pixel areas of the first substrate 100 and are connected to the switching elements T.

A data fan-out part 111, a data pad part 113, a data connection line 115, a gate fan-out part 121, a gate pad part 123, a gate connection line 125, a guard-ring line 131, a first electrode 133, a shorting point SP, a second electrode 135, a seal line 140 and a resistance division part 150 are disposed in the peripheral area PA of the first substrate.

The data fan-out part 111, the data pad part 113 and the data connection line 115 are disposed in a first area PAA1 adjacent to end portions of the data lines DL in the peripheral area PA.

The data fan-out part 111 includes a plurality of data fan-out lines DFL which is connected to the respective end portions of the data lines DL. The data pad part 113 includes a plurality of data pads DPD which is connected to the data fan-out lines DFL, respectively. The data connection line 115 is commonly connected to the plurality of data pads DPD. An electronic signal is applied to the data lines DL through the data connection line 115 in the electric-field exposure process.

The gate fan-out part 121, the gate pad part 123 and the gate connection line 125 are disposed in a second area PAA2 adjacent to end portions of the gate lines GL in the peripheral area PA.

The gate fan-out part 121 includes a plurality of gate fan-out line GFL which is connected to the respective end portions of the gate lines GL. The gate pad part 123 includes a plurality of gate pads GPD which is connected to respective corresponding gate fan-out lines GFL. The gate connection line 125 is commonly connected to the plurality of gate pads GPD. An electronic signal is applied to the gate lines GL through the gate connection line 125 in the electric-field exposure process. An end portion of the gate connection line 125 is connected to an end portion of the data connection line 115. A node N is defined as a portion where the gate connection line 125 is connected to the data connection line 115.

The guard-ring line 131 is disposed in an outside area surrounding the display area DA. The guard-ring line 131 prevents an uncured sealant from flowing in the display area DA. The guard-ring line 131 receives the electronic signal in the electric-field exposure process and prevents an uncured sealant having a polar substance from flowing in the display area DA.

The first electrode 133 is connected to the guard-ring line 131 and receives a first electronic signal in the electric-field exposure process. The first electronic signal is applied to the guard-ring line 131.

The shorting point SP is connected to a common electrode CE of the second substrate 200. The shorting point SP is electrically connected to the resistance division part 150. The second electrode 135 receives an electronic signal and is connected to the shorting point SP. In an exemplary embodiment of the present invention, the second electrode 135 receives a second electronic signal in the electric-field exposure process. The second electronic signal is applied to the common electrode CE of the second substrate 200.

The seal line 140 is disposed adjacent to the guard-ring line 131 and surrounds the guard-ring line 131. The seal line 140 overlaps the data fan-out part 111 and the gate fan-out part 121. Thus, the seal line 140 is disposed between the guard-ring line 131 and the data and gate pad parts 111 and 121. A sealant is disposed on the seal line 140.

The resistance division part 150 connects the first electrode 133 with the node N. The resistance division part 150 divides a first electronic signal of a first level applied to the first electrode 133 by division resistance elements and provides a divided signal to the node N. The divided signal has a level which is lower than the first level. The division resistance elements may be transistors as shown in FIG. 2, or diodes, resistors, etc.

The resistance division part 150 may be directly formed in the peripheral area PA. The resistance division part 150 may be formed via a process that is substantially same as a process for forming the data lines DL, the gate lines GL and the switching elements T in the display area DA.

The second substrate 200 includes a common electrode CE which overlaps the pixel electrodes PE and the guard-ring line 131. The second substrate 200 includes a shorting electrode SE which is disposed in the peripheral area and which is connected to the common electrode CE. The shorting electrode SE overlaps the shorting point SP of the first substrate 100 and is electrically connected to the shorting point SP through a conductive adhesion member.

Referring to FIG. 2, the resistance division part 150 includes a first transistor TR1 and a second transistor TR2. The first transistor TR1 includes a control terminal and an input terminal connected to the first electrode 133 and an output terminal connected to the node N. The second transistor TR2 includes a control terminal connected to the input terminal of the first transistor TR1, an input terminal connected to the node N and an output terminal connected to the second electrode 135.

For example, when a voltage V1 of a first level is applied to the first electrode 133 and a voltage (GND) of a second level is applied to the second electrode 135, the first transistor TR1 and the second transistor TR2 are turned on. The first and second transistors TR1 and TR2 are operated as the division resistance elements that enable a divided voltage Vd between the voltage V1 of the first level and the voltage (GND) of the second level to be applied to the node N. A level of the divided voltage Vd may be determined by channel widths of the first and second transistor TR1 and TR2.

Thus, the voltage V1 of the first level may be applied to the first electrode 133, the divided voltage Vd may be applied to the node N, and the voltage V2 (GND) of the second level may be applied to the second electrode 135. Here (V1>Vd>V2).

The divided voltage according to the channel widths of the first and second transistors TR1 and TR2 is shown in Table 1:

TABLE 1

| First electrode: 20 V, Second electrode: GND | | |
|---|---|---|
| | TR 1 | TR 2 |
| Channel width | 1.5 mm | 3.0 mm |
| Divided voltage | 10 V | |

Referring to Table 1, when a ratio in channel width of the first transistor TR1 to the second transistor TR2 is 1:2, the divided voltage may be about 10V which is about ½ of the voltage between about 20V applied to the first electrode 133 and about 0V (GND) applied to the second electrode 135.

In an exemplary embodiment of the present invention, the first electrode 133 receives the voltage V1 of the first level, and the voltage V1 is applied to the guard-ring line 131. The node N receives the divided voltage Vd, and the divided voltage Vd is applied to the plurality of pixel electrodes PE of the first substrate 100. The second electrode 135 receives the voltage V2 (GND) of the second level, and the voltage V2 (GND) is applied to the common electrode CE of the second substrate 200.

A first electric field is formed between the guard-ring line 131 and the common electrode CE, and a second electric field is formed between the plurality of pixel electrodes PE and the common electrode CE. The second electric field may be weaker than the first electric field.

Liquid crystal molecules in the liquid crystal layer between the first and second substrates 100 and 200 may be arranged by the second electric field formed between the plurality of pixel electrodes PE and the common electrode CE. For example, the second electric field may correspond to an electric field for displaying a white image.

The first electric field is formed by the guard-ring line 131 and may prevent the uncured sealant disposed on the seal line 140 from flowing in the display area DA.

After the first and second electric fields are formed in the display cell, ultraviolet light or infrared light is radiated to the display cell. Thus, reactive mesogen (RM) in the liquid crystal (LC) layer is cured by the ultraviolet light or the infrared light, and thus, a cured layer is formed in the display area DA of the first and second substrates 100 and 200. The cured layer has a pre-tilt angle. The sealant disposed on the seal line 140 is cured by the ultraviolet light or the infrared light.

In an exemplary embodiment of the present invention, when first and second electronic signals are applied to the display cell by an electric-field exposure apparatus of a two-electrode structure, the display cell receives the first electronic signal, the second electronic signal and signals obtained by dividing the first and second electronic signals. Therefore, the display cell may perform the electric-field exposure process corresponding to a three-electrode structure using the electric-field exposure apparatus of the two-electrode structure which provides the display cell with two electronic signals. In an exemplary embodiment of the present invention, the first electric field is formed between the guard-ring line and the common electrode, and the second electric field is formed between the pixel electrode and the common electrode, and therefore, a deterioration of the pre-tilt angle due to the uncured sealant may be prevented.

Figure 3:
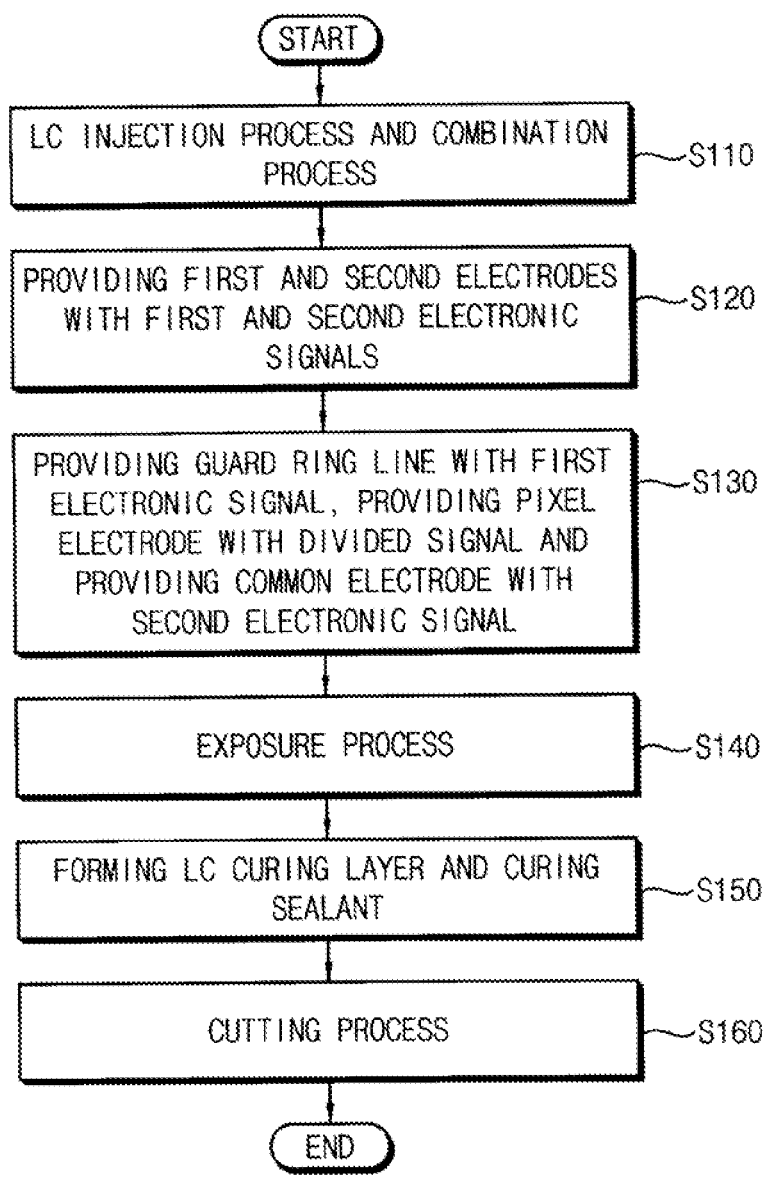
FIG. 3 is a flowchart illustrating a method of manufacturing a display panel using a display cell as shown in FIG. 1, according to an exemplary embodiment of the present invention.
Figure 4:
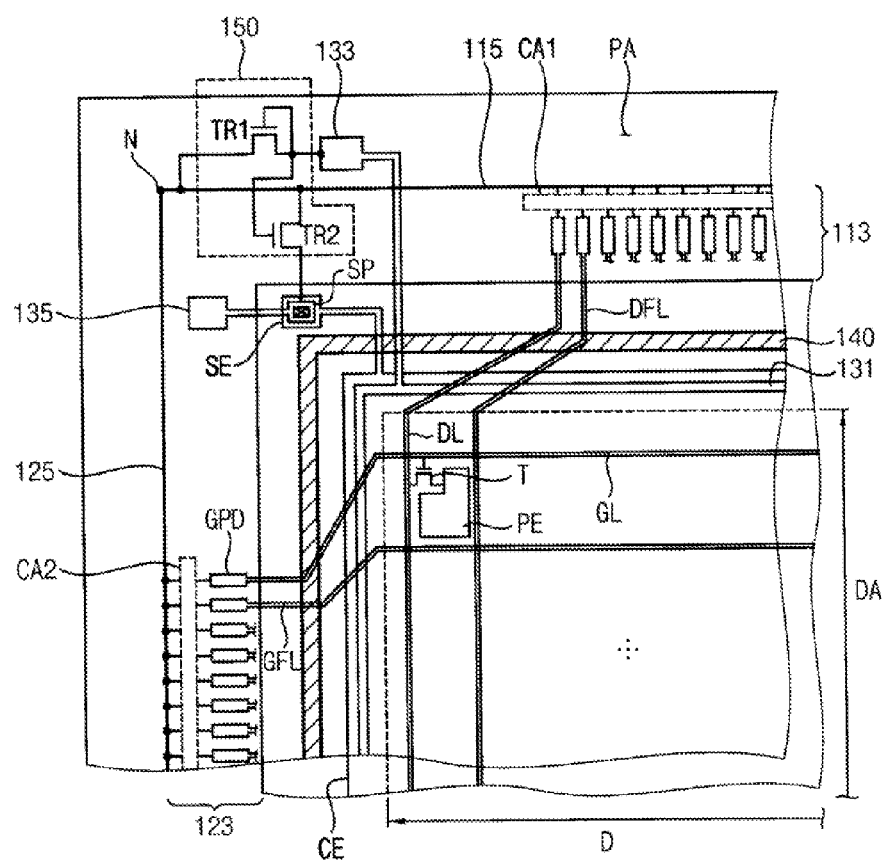
FIG. 4 is an enlarged view illustrating a portion of a display panel manufactured by a display cell as shown in FIG. 1, according to an exemplary embodiment of the present invention.

FIG. 3 is a flowchart illustrating a method of manufacturing a display panel using a display cell as shown in FIG. 1, according to an exemplary embodiment of the present invention. FIG. 4 is an enlarged view illustrating a portion of a display panel manufactured by a display cell as shown in FIG. 1, according to an exemplary embodiment of the present invention.

Referring to FIGS. 2 and 3, the sealant is formed on the seal line 140 of the first or second substrate 100 or 200. The LC layer is formed on the first or second substrate 100 or 200 which has the sealant formed on the seal line 140, via a drop process. The LC layer includes reactive mesogen (RM). After the LC layer is formed, the first and second substrates 100 and 200 are combined together via a combination process (step S110). Alternatively, after the combination process is finished, the LC layer may be injected in the space between the first and second substrates 100 and 200 via an injection process. Accordingly, the display cell as shown in FIG. 2 is formed.

The first electrode 133 receives the first electronic signal of the first level and the second electrode 135 receives the second electronic signal of the second level that is lower than the first level via the electric-field exposure apparatus of the two-electrode structure (step S120).

The resistance division part 150 provides the node N with a divided signal having a level which is between the first and second levels of the first and second electronic signals applied to the first and second electrodes 133 and 135, respectively.

Therefore, the guard-ring line 131 receives the first electronic signal, the pixel electrodes PE receive the divided signal, and the common electrode CE receives the second electronic signal (step S130). In an exemplary embodiment of the present invention, the first and second electric fields may be formed in the display cell via the electric-field exposure apparatus of the two-electrode structure. The second electric field is weaker than the first electric field.

The first electric field is formed between the guard-ring line 131 and the common electrode CE, and the second electric field is formed between the pixel electrode PE and the common electrode CE. Therefore, liquid crystal molecules in the LC layer between the first and second substrates 100 and 200 are arranged by the second electric field formed between the pixel electrodes PE and the common electrode CE. The first electric field formed between the guard-ring line 131 and the common electrode CE may prevent the uncured sealant disposed on the seal line 140 from flowing in the display area DA.

After the first and second electric fields are formed, ultraviolet light or infrared light is radiated to the display cell via the electric-field exposure process (step S140).

Thus, reactive mesogen (RM) in the liquid crystal (LC) layer is cured by the ultraviolet light or the infrared light, and thus, a cured layer which has a pre-tilt angle is formed in the display area DA. The sealant disposed on the seal line 140 is cured by the ultraviolet light or the infrared light (step S150).

By a cutting process, signal lines which are substantially related to the operation of the data lines, the gate lines, transistors and the pixel electrodes in the display area DA, are cut using a laser beam as shown in FIG. 4 (step S160).

For example, to drive the display panel, the data lines of the display panel are individually driven by their respective corresponding data signals, and the gate lines of the display panel are individually driven by their respective corresponding gate signals.

In the electric-field exposure process, the data lines are jointly connected to the data connection line, and the gate lines are jointly connected to the gate connection line to receive the same electronic signal.

In the cutting process, the signal lines in the first cutting area CA1 between the data connection line and the data pad part and the signal lines in the second cutting area CA2 between the gate connection line and the gate pad part are cut using a laser beam. Therefore, the data pad part and the gate pad part is disconnected from the data connection line and the gate connection line, respectively, and thus, the data lines of the display panel may be individually driven and the gate lines of the display panel may be individually driven.

After the cutting process, the display cell may turn into the display panel.

Referring to FIG. 4, the resistance division part 150, the first electrode 133 and the second electrode 135 used in the electric-field exposure process may be disposed in the peripheral area PA of the display panel. The resistance division part 150 is floated from the data lines DL and the gate lines GL, and thus, the operation of the display panel is unrelated to the resistance division part 150. The first electrode 133 does not receive an electronic signal when the display panel is driven, and thus, the guard-ring line is not driven. Thus, the operation of the display panel is unrelated to the first electrode 133. Alternatively, the first electrode 133 and the guard-ring line 131 may be floated from each other via the cutting process. The second electrode 135 may drive the common electrode CE of the display panel. For example, a common voltage VCOM is applied to the common electrode CE through the second electrode 135.

Figure 5:
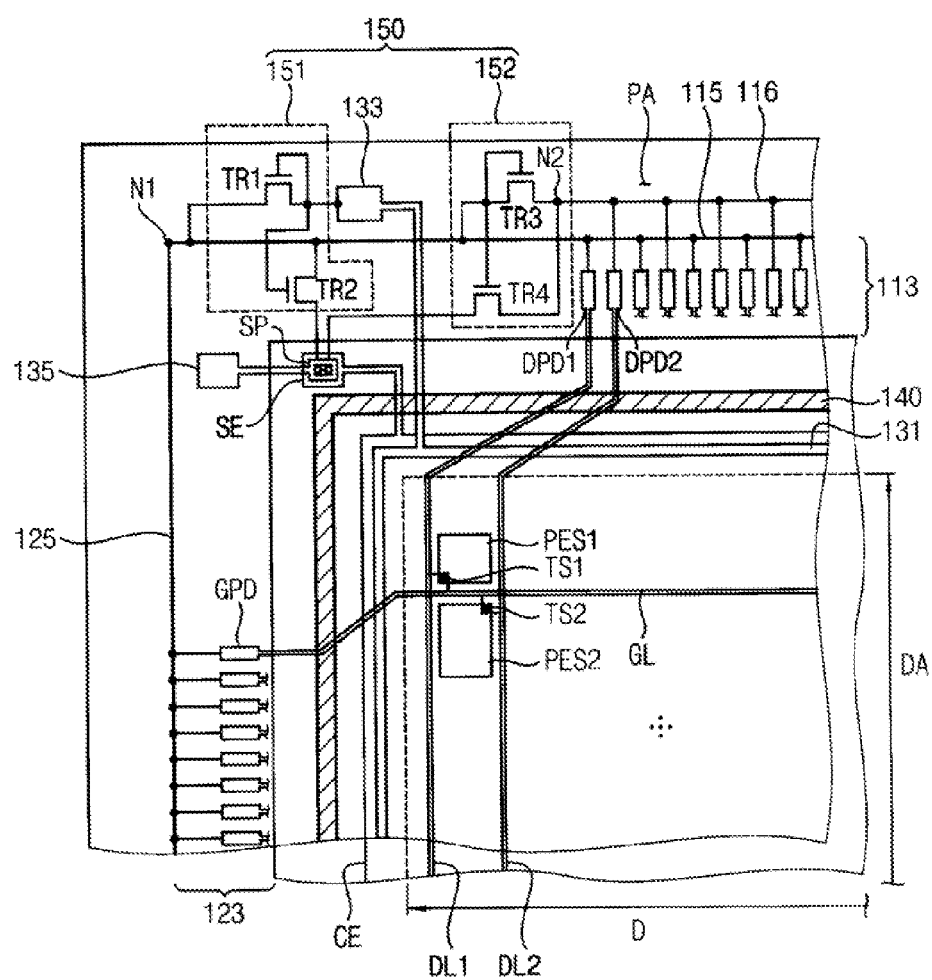
FIG. 5 is an enlarged view illustrating a portion of a display cell according to an exemplary embodiment of the present invention.

FIG. 5 is an enlarged view illustrating a portion of a display cell according to an exemplary embodiment of the present invention.

Referring to FIGS. 1 and 5, the display cell may include a first substrate 100, a second substrate 200 and a liquid crystal layer disposed between the first and second substrates 100 and 200. The display cell is divided into a display area DA and a peripheral area PA surrounding the display area DA.

A plurality of data lines DL1 and DL2, a plurality of gate lines GL, a plurality of switching elements TS1 and TS2, a plurality of sub pixel electrodes PES1 and PES2 are disposed in the display area DA of the first substrate 100. In an exemplary embodiment of the present invention, a pixel electrode disposed in a pixel area include a first sub pixel electrode PES1 and a second sub pixel electrode PES2 that is spaced apart from the first sub pixel electrode PES1.

The data lines DL1 and DL2 extend in a first direction D1 and are arranged in a second direction D2 crossing the first direction D1. The gate lines GL extend in the second direction D2 and are arranged in the first direction D1. The switching elements TS1 and TS2 are connected to the data lines DL1 and DL2 and the gate lines GL. The pixel electrodes PES1 and PES2 are respectively connected to the switching elements TS1 and TS2.

According to exemplary embodiment of the present invention, a first switching element TS1, a second switching element TS2, a first sub pixel electrode PES1 and a second sub pixel electrode PES2 are disposed in the pixel area of the display area. The first switching element TS1 is connected to the first data line DL1 and the gate line GL, and the first sub pixel electrode PES1 is connected to the first switching element TS1. The second switching element TS2 is connected to the second data line DL2 and the gate line GL, and the second sub pixel electrode PES2 is connected to the second switching element TS2. For example, the first sub pixel electrode PES1 may be driven with a voltage more than a voltage applied to the second sub pixel electrode PES2.

A data fan-out part 111, a data pad part 113, a first data connection line 115, a second data connection line 116, a gate fan-out part 121, a gate pad part 123, a gate connection line 125, a guard-ring line 131, a first electrode 133, a shorting point SP, a second electrode 135, a seal line 140 and a resistance division part 150 are disposed in the peripheral area PA of the first substrate 100.

The data fan-out part 111 includes a data fan-out line DFL which is connected to an end portion of the data line DL. The data pad part 113 includes a data pad which is connected to the data fan-out line DFL. The first data connection line 115 is commonly connected to a plurality of first data pads DPD1 which are connected to the plurality of first data lines DL1 that connects to the plurality of first switching elements TS1. The second data connection line 116 is commonly connected to a plurality of second data pads DPD2 which are connected to the plurality of second data lines DL2 that connects to the plurality of second switching elements TS2. The first data connection line 115 transfers an electronic signal to the first sub pixel electrodes PES1 through the first switching elements TS1, and the second data connection line 116 transfers an electronic signal to the second sub pixel electrodes PES2 through the second switching elements TS2.

The gate fan-out part 121 includes a gate fan-out line GFL which is connected to an end portion of the gate line GL. The gate pad part 123 includes a gate pad GPD which is connected to the gate fan-out line GFL. The gate connection line 125 is commonly connected to a plurality of gate pads GPD. The electronic signal is applied to the gate lines GL through the gate connection line 125 in the electric-field exposure process. An end portion of the gate connection line 125 is connected to the first data connection line 115 and a first node N.

The guard-ring line 131 is disposed in an outside area surrounding the display area DA. The guard-ring line 131 prevents an uncured sealant from flowing in the display area DA. The guard-ring line 131 receives an electronic signal in the electric-field exposure process, and thus, an electric field is formed which prevents the uncured sealant having a polar substance from flowing in the display area DA.

The first electrode 133 is connected to the guard-ring line 131 and receives a first electronic signal in the electric-field exposure process. The first electronic signal is applied to the guard-ring line 131.

The shorting point SP is connected to a common electrode CE of the second substrate 200. The shorting point SP is electrically connected to the resistance division part 150. The second electrode 135 receives an electronic signal and is connected to the shorting point SP. In an exemplary embodiment of the present invention, the second electrode 135 receives a second electronic signal in the electric-field exposure process. The second electronic signal is applied to the common electrode CE of the second substrate 200.

The seal line 140 is disposed adjacent to the guard-ring line 131 and surrounds the guard-ring line 131.

The resistance division part 150 receives a first electronic signal and a second electronic signal from an electric-field exposure apparatus of a two-electrode structure in the electric-field exposure process and outputs a first electronic signal, a first divided signal, a second divided signal and a second electronic signal using the first and second electronic signals.

The resistance division part 150 includes a first division part 151 and a second division part 152. The first division part 151 is connected to the first electrode 133 and the first node N1 and provides a first node N1 with a first divided signal which is obtained by dividing the first electronic signal applied to the first electrode 133. The second division part 152 is connected to the first node N1 and a second node N2 which is positioned at an end portion of the second data connection line 116. The second division part 152 provides a second node N2 with a second divided signal which is obtained by dividing the first divided signal applied to the first node N1.

The second substrate 200 includes a common electrode CE which overlaps the sub pixel electrodes PES1 and PES2 and the guard-ring line 131. A shorting electrode SE is disposed in the peripheral area PA of the second substrate 200. The shorting electrode SE overlaps the shorting point SP of the first substrate 100 and is electrically connected to the shorting point SP through a conductive adhesion member.

The first division part 151 includes a first transistor TR1 and a second transistor TR2. The first transistor TR1 includes a control terminal and an input terminal connected to the first electrode 133 and an output terminal connected to the first node N1. The second transistor TR2 includes a control terminal connected to the input terminal of the first transistor TR1, an input terminal connected to the first node N1, and an output terminal connected to the second electrode 135.

The second division part 152 includes a third transistor TR3 and a fourth transistor TR4. The third transistor TR3 includes a control terminal and an input terminal connected to the first node N1 and an output terminal connected to the second node N2. The fourth transistor TR4 includes a control terminal connected to the input terminal of the third transistor TR3, an input terminal connected to the second node N2, and an output terminal connected to the second electrode 135.

For example, when a voltage V1 of a first level is applied to the first electrode 133 and a voltage V2 (GND) of a second level is applied to the second electrode 135, the first transistor TR1 and the second transistor TR2 are turned on. The first and second transistors TR1 and TR2 are operated as division resistance elements, and thus, a first divided voltage Vd1 having a level between the first level of the voltage V1 and the second level of the voltage V2 (GND) is applied to the first node N1. The level of the first divided voltage Vd1 may be determined by channel widths of the first and second transistor TR1 and TR2.

When a voltage V1 of a first level is applied to the first electrode 133 and a voltage V2 (GND) of a second level is applied to the second electrode 135, the third transistor TR3 and the fourth transistor TR4 are turned on. The third and fourth transistors TR3 and TR4 are operated as division resistance elements, and thus, a second divided voltage Vd2 having a level between the level of the first divided voltage Vd1 and the second level of the voltage V2 (GND) is applied to the second node N2. The level of the second divided voltage Vd2 may be determined by channel widths of the third and fourth transistor TR3 and TR4.

Therefore, the first electronic signal V1, the first divided voltage Vd1, the second divided voltage Vd2 and the second electronic signal V2 (GND) may satisfy the following equation: $V1 > Vd1 > Vd2 > V2$.

According to an exemplary embodiment of the present invention, the first electrode 133 receives the voltage V1 of the first level, and the voltage V1 is applied to the guard-ring line 131. The first node N1 receives the first divided voltage Vd1, and the first divided voltage Vd1 is applied to the first sub pixel electrodes PES1 of the first substrate 100. The second node N2 receives the second divided voltage Vd2, and the second divided voltage Vd2 is applied to the second sub pixel electrodes PES2 of the first substrate 100. The second electrode 135 receives the voltage V2 (GND) of the second level, and the voltage V2 (GND) is applied to the common electrode CE of the second substrate 200.

According to an exemplary embodiment of the present invention, a first electric field is formed between the guard-ring line 131 and the common electrode CE, a second electric field is formed between the first sub pixel electrodes PES1 and the common electrode CE, and a third electric field is formed between the second sub pixel electrodes PES2 and the common electrode CE. The second electric field may be weaker than the first electric field, and the third electric field may be weaker than the second electric field.

Liquid crystal molecules in the liquid crystal (LC) layer corresponding to the first sub pixel electrodes PES1 are rendered to form a first arrangement structure by the second electric field, and liquid crystal molecules in the LC layer corresponding to the second sub pixel electrodes PES2 are rendered to have a second arrangement structure by the third electric field. Thus, the LC layer in the display area has a multi-domain structure. For example, the second electric field may be an electric field for displaying a high-luminance white image, and the third electric field may be an electric field for displaying a low-luminance white image.

The first electric field is formed by the guard-ring line 131, and the first electric field may prevent the uncured sealant disposed on the seal line 140 from flowing in the display area DA.

After the first, second and third electric fields are formed in the display cell, ultraviolet light or infrared light is radiated to the display cell. Thus, reactive mesogen (RM) in the LC layer is cured by the ultraviolet light or the infrared light, and thus, a curing layer is formed in the display area DA of the first and second substrates 100 and 200. The curing layer has a first pre-tilt angle formed in a first area in which the first sub pixel electrodes PES1 are disposed and a second pre-tilt angle formed in a second area in which the second sub pixel electrodes PES2 are formed. The sealant disposed on the seal line 140 is cured by the ultraviolet light or the infrared light.

Figure 6:
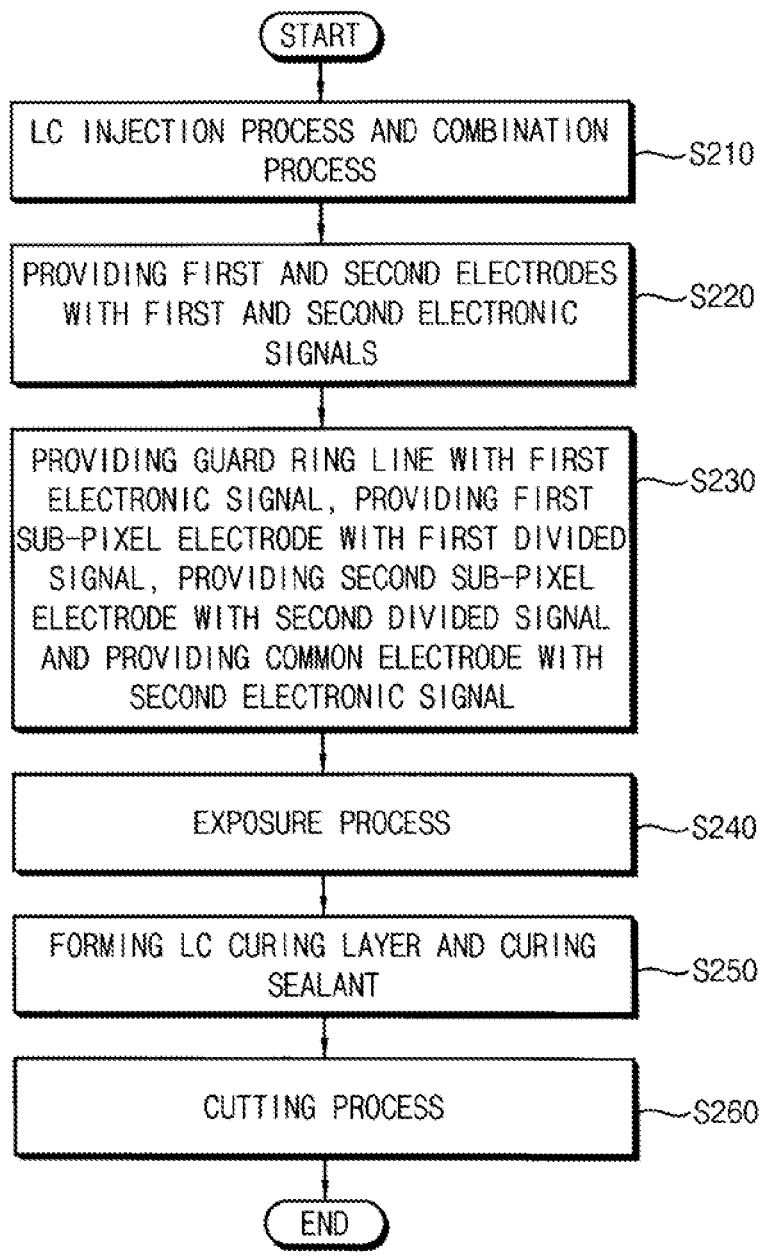
FIG. 6 is a flowchart illustrating a method of manufacturing a display panel using a display cell as shown in FIG. 5, according to an exemplary embodiment of the present invention.
Figure 7:
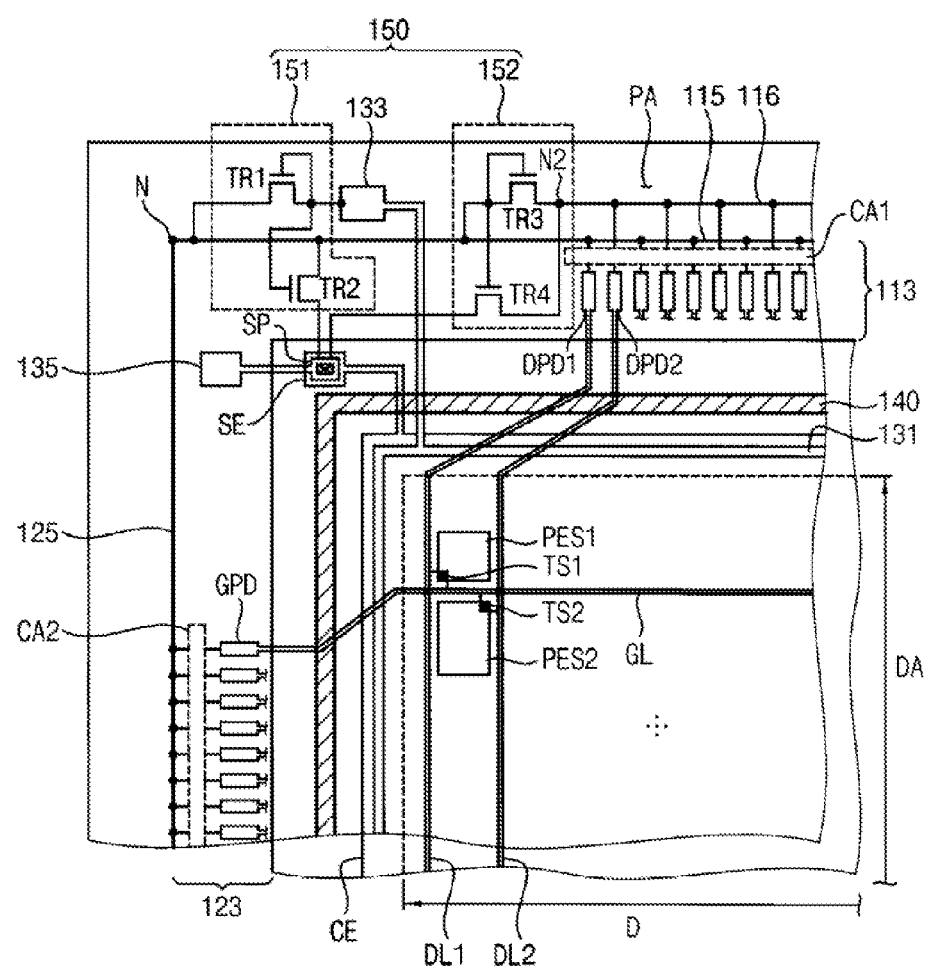
FIG. 7 is an enlarged view illustrating a portion of a display panel manufactured by a display cell as shown in FIG. 5, according to an exemplary embodiment of the present invention.

In an exemplary embodiment of the present invention, when first and second electronic signals are applied to the display cell by an electric-field exposure apparatus of a two-electrode structure, the display cell receives the first and second electronic signals and the first and second divided signals obtained by dividing the first and second electronic signals. Therefore, the display cell may perform an electric-field exposure process corresponding to a four-electrode structure using the electric-field exposure apparatus of the two-electrode structure which provides the display cell with two electronic signals. In an exemplary embodiment of the present invention, the first electric field is formed between the guard-ring line and the common electrode, the second electric field is formed between the first sub-pixel electrode and the common electrode, and the third electric field is formed between the second sub-pixel electrode and the common electrode. Therefore, a plurality of pre-tilt angles may be formed via the electric-field exposure apparatus of the two-electrode structure. A deterioration of the pre-tilt angles may be prevented by driving the guard-ring line with the electronic signal FIG. 6 is a flowchart illustrating a method of manufacturing a display panel using a display cell as shown in FIG. 5, according to an exemplary embodiment of the present invention. FIG. 7 is an enlarged view illustrating a portion of a display panel manufactured by a display cell as shown in FIG. 5, according to an exemplary embodiment of the present invention.

The sealant is formed on the seal line 140 of the first or second substrate 100 or 200. The LC layer is formed on the first or second substrate 100 or 200 via a drop process. The LC layer includes reactive mesogen (RM). After the LC crystal layer is formed, the first and second substrates 100 and 200 are combined together via a combination process (step S210). Alternatively, after the combination process finished, the LC layer may be injected into the space between the first and second substrates 100 and 200 via an injection process. The display cell as shown in FIG. 2 is formed.

The first electrode 133 receives the first electronic signal of the first level, and the second electrode 135 receives the second electronic signal of the second level that is lower than the first level via the electric-field exposure apparatus of the two-electrode structure (step S220).

Therefore, the guard-ring line 131 receives the first electronic signal, the first sub-pixel electrodes PES1 receive the first divided signal, the second sub-pixel electrodes PES2 receives the second divided signal, and the common electrode CE receives the second electronic signal (step S230).

In an exemplary embodiment of the present invention, the first, second and third electric fields may be formed in the display cell via the electric-field exposure apparatus of the two-electrode structure. A first electric field is formed between the guard-ring line 131 and the common electrode CE, a second electric field is formed between the first sub pixel electrodes PES1 and the common electrode CE, and a third electric field is formed between the second sub pixel electrodes PES2 and the common electrode CE. The second electric field may be weaker than the first electric field, and the third electric field may be weaker than the second electric field.

Therefore, liquid crystal molecules in the liquid crystal layer corresponding to the first sub pixel electrodes PES1 are rendered to have a first arrangement structure by the second electric field, and liquid crystal molecules in the liquid crystal layer corresponding to the second sub pixel electrodes PES2 are rendered to have a second arrangement structure by the third electric field. The first electric field is formed by the guard-ring line 131 and may prevent the uncured sealant disposed on the seal line 140 from flowing in the display area DA.

After the first, second and third electric fields are formed in the display cell, ultraviolet light or infrared light is radiated to the display cell via the electric-field exposure process (step S240).

Thus, reactive mesogen (RM) in the liquid crystal (LC) layer is cured by the ultraviolet light or the infrared light, and thus, a curing layer which has first and second pre-tilt angles is formed in the display area DA. The sealant disposed on the seal line 140 is cured by the ultraviolet light or the infrared light (step S250).

By a cutting process, signal lines which are substantially related to the operation of the data lines, the gate lines, transistors and the pixel electrodes in the display area DA, are cut using a laser beam as shown in FIG. 7 (step S260).

For example, to drive the display panel, the data lines DL1 and DL2 of the display panel are individually driven by their respective corresponding data signals, and the gate lines GL of the display panel are individually driven by their respective corresponding gate signals.

However, in the electric-field exposure process, the data lines DL1 and DL2 are connected with each other through the data connection line and receive the same electronic signal. The gate lines GL are connected with one another through the gate connection line and receive the same electronic signal.

Thus, in the cutting process, the signal lines in the first cutting area CA1 between the data connection line and the data pad part and the signal lines in the second cutting area CA2 between the gate connection line and the gate pad part are cut using a laser beam. Therefore, the data pad part and the gate pad part are disconnected from the data connection line and the gate connection line, respectively, and thus, the data lines of the display panel may be individually driven and the gate lines of the display panel may be individually driven.

After the cutting process, the display cell may turn into the display panel as shown in FIG. 7.

According to an exemplary embodiments of the present invention, the display cell receives two electronic signals via an electric-field exposure apparatus of a two-electrode structure, and the display cell generates at least one divided signal through a resistance division part, and thus, a plurality of electric fields may be formed in the display cell. Therefore, in the electric-field exposure process, a deterioration of the pre-tilt angle due to an uncured sealant may be prevented using the plurality of electric fields.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. An electric-field exposure method, comprising:
   forming a display cell, the display cell comprising a pixel electrode electrically connected to a data line and a gate line, a guard-ring line surrounding a display area on which the pixel electrode is disposed, a common electrode overlapping the guard-ring line, and a resistance division part connected to a node which is connected to a data pad and a gate pad;
   providing a first electrode and a second electrode with first and second electronic signals, respectively, the first electrode connected to the guard-ring line, the second electrode connected to the common electrode;
   providing the node with a divided signal obtained by dividing the first and second signals through the resistance division part; and
   radiating light to the display cell when a first electric field is formed between the guard-ring line and the common electrode, and a second electric field is formed between the pixel electrode and the common electrode.

2. The electric-field exposure method of claim 1, further comprising forming a curing layer which has a pre-tilt angel between the pixel electrode and the common electrode.

3. The electric-field exposure method of claim 1, wherein the display cell comprises a seal line including a sealant, and wherein the guard-ring line is disposed between the seal line and the display area.

4. The electric-field exposure method of claim 3, wherein the display cell comprises a data connection line connected to the data line and a gate connection line connected to the gate line, and wherein the data connection line is connected to the gate connection line through the node.

5. The electric-field exposure method of claim 4, wherein the resistance division part comprises a transistor.

6. The electric-field exposure method of claim 5, wherein the first electric field is stronger than the second electric field.

7. The electric-field exposure method of claim 6, further comprising forming a curing layer between the pixel electrode and the common electrode, the curing layer having a single pre-tilt angel.

8. The electric-field exposure method of claim 3, wherein the pixel electrode comprises:
   a first sub pixel electrode connected to a first data line; and
   a second sub pixel electrode connected to a second data line, wherein the second sub pixel electrode is spaced apart from the first sub pixel electrode.

9. The electric-field exposure method of claim 8, wherein the display cell comprises:
   a first data connection line connected to a first data pad of the first data line;
   a second data connection line connected to a second data pad of the second data line;
   a first node connected to the first data connection line; and
   a second node connected to the second data connection line.

10. The electric-field exposure method of claim 9, wherein the resistance division part is connected to the first electrode, the second electrode, the first node, and the second node, the resistance division part configured to divide the first and second electronic signals into a first divided signal and a second divided signal and to provide the first and second nodes with the first and second divided signals, respectively.

11. The electric-field exposure method of claim 10, wherein the second electric field is formed between the first sub pixel electrode and the common electrode, and a third electric field is formed between the second sub pixel electrode and the common electrode.

12. The electric-field exposure method of claim 11, wherein the first electric field is stronger than the second electric field and the third electric field.

13. The electric-field exposure method of claim 12, wherein the second electric field is different from the third electric field.

14. The electric-field exposure method of claim 13, further comprising:
   forming a curing layer which has a first pre-tilt angle formed in a first area having the first sub pixel electrode and a second pre-tilt angle formed in a second area having the second sub pixel electrode.

15. A display panel, comprising:
   a pixel electrode disposed in a display area of a first substrate and connected to a data line and a gate line;
   a guard-ring line disposed in a peripheral area, the guard-ring line surrounding an outside of the display area;
   a common electrode disposed on a second substrate opposite the first substrate, the common electrode overlapping the pixel electrode and the guard-ring line;
   a first electrode connected to the guard-ring line;
   a second electrode disposed on the first substrate and connected to a shorting point, the shorting point electrically connected to the common electrode; and
   a resistance division part disposed on the first substrate, the resistance division part comprising a transistor connected to the first electrode and the shorting point.

16. The display panel of claim 15, further comprising a seal line disposed between the guard-ring line and the display area.

17. The display panel of claim 15, further comprising a curing layer formed between the pixel electrode and the common electrode, the curing layer having at least one pre-tilt angel.

18. The display panel of claim 15, wherein the pixel electrode comprises a first sub pixel electrode connected to a first data line and a second sub pixel electrode connected to a second data line, wherein the second sub pixel electrode is spaced apart from the first sub pixel electrode.

19. The display panel of claim 15, further comprising a curing layer which comprises a first pre-tilt angle between the first sub pixel electrode and the common electrode and a second pre-tilt angle between the second sub pixel electrode and the common electrode.

20. The display panel of claim 15, further comprising:
a data connection line disposed adjacent to a data pad of the data line, the data connection line extending in a direction substantially parallel with the gate line; and
a gate connection line disposed adjacent to a gate pad of the gate line, the gate connection line extending in a direction substantially parallel with the data line, wherein the resistance division part is connected to the data connection line and the gate connection line.

21. A display panel, comprising:
a first substrate having a display area and a peripheral area surrounding the display area, wherein a pixel electrode is disposed in the display area, and a guard-ring line is disposed in the peripheral area;
a second substrate opposite the first substrate, the second substrate including a common electrode overlapping the pixel electrode and the guard-ring line;
a first electrode connected to the guard-ring line, the first electrode applied with a first level voltage;
a second electrode connected to the common electrode, the second electrode applied with a second level voltage;
a node electrode connected to the pixel electrode, the node electrode applied with a third level voltage; and
a resistance division part connected to the first electrode and the node electrode, the resistance division part configured to output the third level voltage by dividing the first level voltage and the second level voltage.

* * * * *